(12) United States Patent
Midgley et al.

(10) Patent No.: US 6,642,955 B1
(45) Date of Patent: Nov. 4, 2003

(54) SURVEILLANCE CAMERA SYSTEM WITH INFRARED AND VISIBLE LIGHT BANDPASS CONTROL CIRCUIT

(75) Inventors: Brent Midgley, Cramington (GB); Dan Hsu, Surrey (CA)

(73) Assignee: Extreme CCTV Inc., Burnaby (CA)

( * ) Notice: Subject to any disclaimer, the term of this patent is extended or adjusted under 35 U.S.C. 154(b) by 0 days.

(21) Appl. No.: 09/478,896

(22) Filed: Jan. 10, 2000

(65) Prior Publication Data (65)

(51) Int. Cl.⁷ ................................................. H04N 9/74
(52) U.S. Cl. ....................................... 348/164; 348/14.1
(58) Field of Search .......................... 348/14.1, 61–67, 348/143–147, 149, 161, 163, 164, 165; H04N 9/74

(56) References Cited

U.S. PATENT DOCUMENTS

| | | | |
|---|---|---|---|
| 4,755,874 A | * 7/1988 | Esrig et al. ................. | 348/126 |
| 5,133,605 A | * 7/1992 | Nakamura ................... | 374/124 |
| 5,732,293 A | * 3/1998 | Nonaka et al. .............. | 396/157 |
| 5,910,816 A | * 6/1999 | Fontenot et al. ............. | 348/65 |
| 5,923,380 A | * 7/1999 | Yang et al. .................. | 348/586 |
| 5,940,139 A | * 8/1999 | Smoot ......................... | 348/584 |

\* cited by examiner

*Primary Examiner*—Chris Kelley
*Assistant Examiner*—Tung Vo

(57) ABSTRACT

A camera system switches electronically between infrared radiation sensing and visible light sensing depending on ambient conditions, to optimize visible picture quality for surveillance. An electronic CCD camera has an optical bandpass filter having a stop band between the infrared radiation spectrum and the visible light spectrum to provide high quality visible light images when not in the infrared mode and high quality mono infrared images when not in visible light mode. A control circuit compares the camera signal with a photocell signal and controls the camera's sensing mode and an if illuminator's operation in accordance with the ambient conditions.

22 Claims, 2 Drawing Sheets

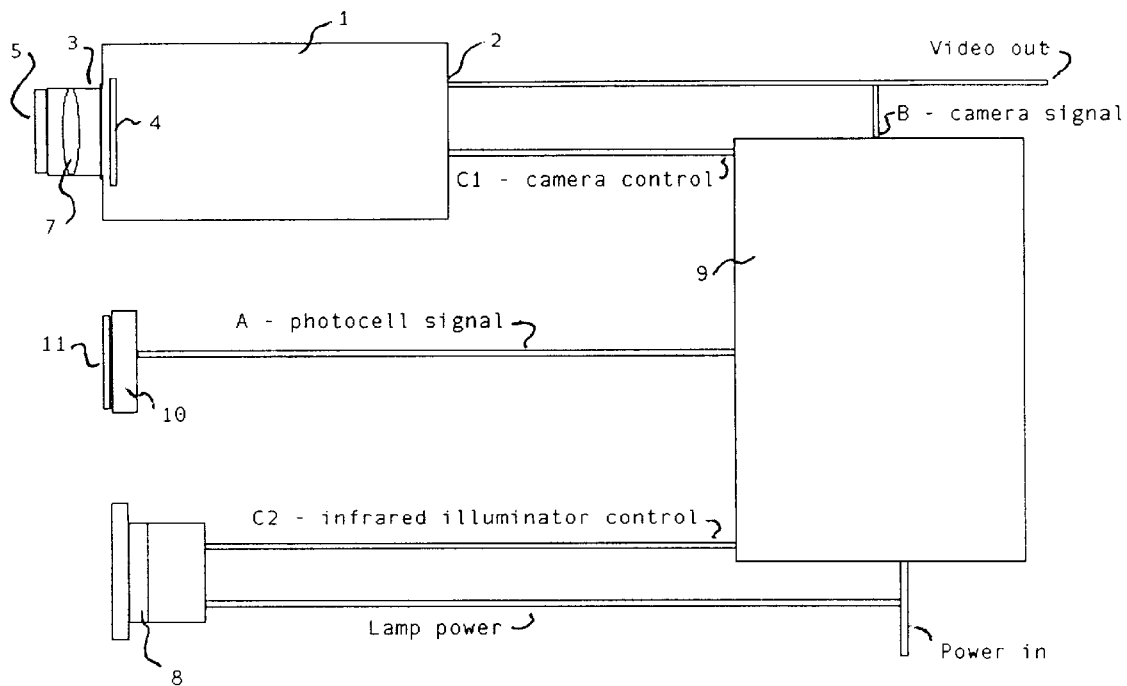
FIGURE 1
FIGURE 2   Bandpass Filter Response
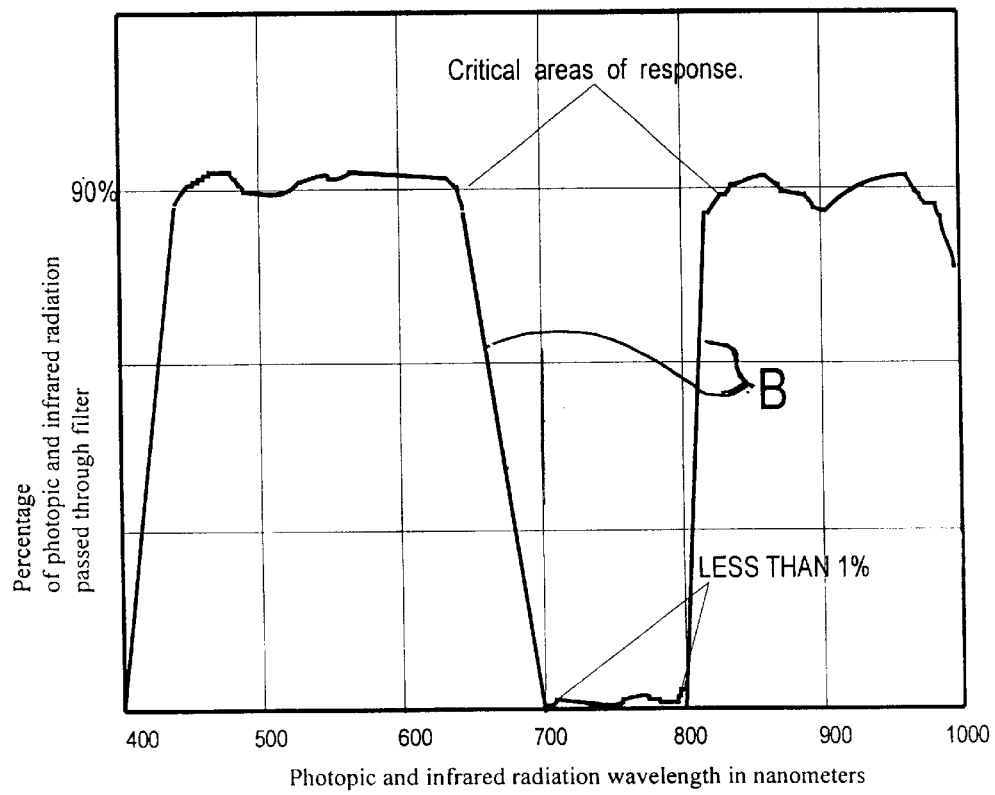

FIGURE 3

Photocell Optical Filter Response

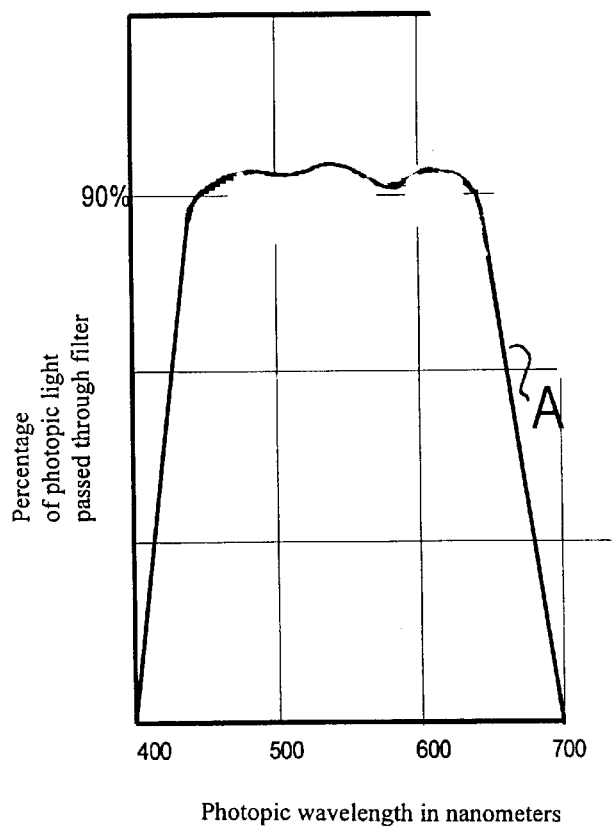

Photopic wavelength in nanometers

FIGURE 4

IF signal A (photocell output) is high and signal B (camera output) is high

THEN signal C1 (camera control) goes low and signal C2 (infrared illuminator control) goes low IF signal A (photocell output) is low and signal B (camera output) is high THEN signal C1 (camera control) goes high and signal C2 (infrared illuminator control) goes low IF signal A (photocell output) is low and signal B (camera output) is low THEN signal C1 (camera control) goes high and signal C2 (infrared illuminator control) goes high C1 and C2 will only reset if A goes high

SURVEILLANCE CAMERA SYSTEM WITH INFRARED AND VISIBLE LIGHT BANDPASS CONTROL CIRCUIT

BACKGROUND OF THE INVENTION

This invention relates to high-quality surveillance camera systems capable of capturing information from a scene under light conditions ranging from dark to well-lit.

OVERVIEW OF THE INVENTION

The invention provides a camera system that switches electronically between infrared radiation sensing and visible light sensing depending on ambient conditions. The camera is provided with a bandpass filter having a stop band between the infrared radiation spectrum and the visible light spectrum in order to provide high quality visible light images when not in the infrared mode and high quality mono infrared images when not in visible light mode. The bandpass filter assists in quantifying the ambient light for the switching control circuit.

PURPOSE OF THE SYSTEM

The purpose of the system is to provide 24 hour CCTV viewing capability of a scene irrespective of ambient lighting conditions. This is achieved by analyzing and quantifying the ambient light available. The system then chooses the appropriate mode of operation to produce optimized picture quality.

SUMMARY OF THE SYSTEM

The system comprises of the following components each of which will be further detailed below:
 a) An electronic colour video CCD camera;
 b) A specially designed optical bandpass filter to be used in the camera;
 c) An infrared illuminator;
 d) A photocell with an optical filter having a specific optical response;
 e) an electronic control circuit.

The electronic control circuit integrates the functions of the component parts and enables the camera system that to switch electronically between infrared radiation sensing and visible light sensing depending on ambient conditions.

DESCRIPTION OF THE DRAWINGS

FIG. 1 is a drawing showing the components of the system.

FIG. 2 is a graph showing the response of the bandpass filter.

FIG. 3 is a graph showing the response of the photocell's optical filter.

FIG. 4 is a flow chart showing the logic of the control system.

DETAILED DESCRIPTION

Referring to FIG. 1, the CCD camera 1 can be essentially a standard CCD colour camera having a charge coupled device (CCD) solid state image sensor and producing composite NTSC, PAL or Y/C video at its output 2. However the optical section 3 is modified to allow both photopic and specific infrared radiation wavelengths to excite the CCD image sensor 4. This is achieved by fitting a bandpass filter 5 with special characteristics. The bandpass filter 5 replaces a typical photopic filter that is often installed on colour cameras. The filter typically fitted to standard colour cameras has the function of blocking all wavelengths longer than 690 nanometers. Also the overall response of a normal filter is tailored to mimic that of the human eyes' colour response. Such a filter totally removes the possibility of the CCD image sensor detecting any near infrared radiation. The replacement, bandpass filter 5 of the current invention however allows all photopic light to pass to the sensor as well as infrared radiation wavelengths between 800 nanometers and 1000 nanometers or longer. The bandpass filter 5 is a multilayer interference type produced on optical quality glass of nominal thickness 1 millimeter. The filter is mounted in very close proximity to the CCD image sensor 4 as this minimizes spurious surface reflections between the CCD image sensor 4, the bandpass filter 5, and the lens 7. The infrared illuminator 8 can be either of the incandescent type or light emitting diode (LED) type. However where space is limited and where high temperatures can be problematic it is more usual to use light emitting diodes as the light source. The diodes are chosen to offer their peak radiation within the infrared radiation pass band of the bandpass filter 5, that is, within the range of 820 nanometers to 940 nanometers. A particularly good choice of LED is 850 nanometers. This puts the radiation in the middle of the filter infrared radiation pass band. However 940 nanometers LED's could be used if it was necessary for the illumination to be covert. Common wavelengths for LEDs that are of particular use are 850 / 880 / 940 nanometers. It is not strictly necessary for the infrared illuminator 8 to be in the same enclosure as the camera 1 and the control circuit 9, although fully integrating these components into an enclosure makes the camera system appealing as a product. The photocell 10 can be Silicon/Germanium, light dependent resistor (LDR), or any other kind that provides a good spectral response. Photosensitive devices are commonly responsive over a wide band of wavelengths. For the purpose of this invention a very specific response is required and to achieve this an optical filter 11 is fitted over the face of the detecting area of the photocell 10. The photocell 10 is part of the electronic control circuit 12.

Referring to FIG. 2, the bandpass filter creates a critical attenuation or stop band between 680 nanometers and 790 nanometers. The spectral response of the filter is critical if optimum colour accuracy is to be achieved and maximum sensitivity in the infrared radiation band to be maintained. It is possible to operate with a filter with more relaxed characteristics, for example, with the stop band from 650 nanometers to 900 nanometers, but colour quality and infrared radiation sensitivity would however be compromised, and the overall performance of the system would be degraded. Good results can be obtained with a stop band between 650 nanometers and 820 nanometers. However, a stop band between 680 nanometers and 790 nanometers, plus or minus 10 nanometers is optimum to provide the desired accuracy and the best integration with the control system of the camera. The transmission within the pass bands of the bandpass filter 5 should be at least 90% between the wavelengths of 450 nanometers to 650 nanometers (the photopic range) and also at least 90% between the wavelengths of 820 nanometers to 940 nanometers (the infrared range). The system can be operated with a bandpass filter with poorer pass tolerances, but the overall performance of the system would be degraded.

Referring to FIG. 3, the response of the photocell's optical filter is generally known as photopic and is depicted in FIG.

3. Its purpose is to let in the visible light in a range corresponding to a human eye's typical sensitivity, while filtering out light beyond that range that could have a distorting or discolouring effect on the image captured by the camera.

Referring to FIG. 4, the purpose of the electronic control system is to form the individual components into a system capable of discriminating between differing lighting conditions and responding in such away as to produce optimal video surveillance pictures in any combination or singular lighting condition. This is achieved in the following way:

a) the camera detects both photopic light and infrared radiation, that is it detects photopic light if present, it detects infrared radiation if present, and it detects both if both are present;

b) the photocell detects only photopic light;

c) an output signal from the camera that is correlated with its detection of photopic and/or infrared radiation is compared with an output signal from the photocell;

d) if the photocell output signal is high and the camera output signal is high, then the output signals at each of C1 and C2 go low.

e) If the photocell output signal is low and the camera output signal is high, C1 goes high, and C2 goes low;

f) if the photocell output signal is low and camera output signal is low, C1 goes high and C2 goes high;

g) the signals at C1 and C2 will be reset only if photocell output signal goes high, that is, if the photocell detects photopic light;

A major advantage of this control circuit is that the image sensor can be pointed directly at the field of view without positive feedback effects. For example, if the photocell is pointed directly at the scene viewed by the camera and a condition prevails where the output of the camera goes below a given threshold and simultaneously the output from the photocell goes below the pre-arranged threshold then a signal would be produced by the control circuit to switch on the infrared illuminator. If the photocell were to detect the infrared radiation it would signal the control circuit to switch off and would create an oscillatory loop which would render the system inoperable. The camera is further modified to facilitate switching from colour to monochrome video. This function is purely electronic and is not controlled in any way by the optics. The internal electronics of the camera are so arranged that an input from the control circuit will cause the camera to operate in either colour or mono mode. This is usually achieved by enabling disabling the camera chroma circuitry.

Timing controls and hysteresis can be applied to each of the control circuit functions to avoid indecisive or false triggering.

The control circuit can optionally be modified to detect specific types of illumination such as low pressure sodium, 595 nanometers, or specific bands of light, simply by altering the pass band of the photocell. This would enable the control circuit to adapt to specific light environments.

The camera could operate in alternative modes, producing digital RGB and Y/C format outputs without fundamentally altering the nature of the system.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. A surveillance camera system having a control circuit that switches a camera between an infrared radiation imaging mode and a visible light imaging mode, based on an ambient light infrared sensing system having an infrared radiation and visible light bandpass filter that essentially blocks all of the infrared radiation and the visible light in a stop band comprising both infrared radiation and visible light wavelengths, the stop band spectrum covering a range of approximately 100 nanometers between approximately 680 nanometers of wavelength and approximately 790 nanometers of wavelength, the stop band thereby significantly differentiating by approximately 100 nanometers passed bandwidths of infrared radiation on a longer wavelength side of the stop band from passed bandwidths of visible light on a shorter wavelength side of the stop band, the significantly differentiated passed bandwidths of infrared and visible light respectively being allowed to proceed toward the camera for further processing.

2. The surveillance camera system of claim 1, in which the bandpass filter blocks more than 99% of the radiation wavelengths in the stop band between the passed infrared radiation spectrum of wavelengths and the passed visible light spectrum of wavelengths.

3. The surveillance camera system of claim 1, having an electronic video colour camera with a charge coupled device image sensor.

4. The surveillance camera system of claim 1, having an infrared illuminator.

5. The surveillance camera system of claim 1, having a photocell with an optical filter having a spectral pass response substantially similar to that of human eyes.

6. The surveillance camera system of claim 1, in which the control circuit is electronic.

7. The surveillance camera system of claim 2, in which the bandpass filter has a stop band that filters out light of wavelengths in a range of 680 nanometers to 790 nanometers.

8. The surveillance camera system of claim 7, in which the bandpass filter passes photopic light of less than 680 and greater than 790 nanometers to the camera.

9. The surveillance camera system of claim 8, in which the bandpass filter passes at least 90% of photopic light of wavelengths in a range of 450 nanometers to 650 nanometers and at least 90% of infrared radiation of wavelengths in a range of 820 nanometers to 940 nanometers.

10. The surveillance camera system of claim 2, in which the bandpass filter is mounted in close proximity to a charge coupled device image sensor of the camera.

11. The surveillance camera system of claim 4, in which the infrared illuminator comprises a diode emitting light with a peak of light emission in the range of 850 to 940 nanometers.

12. The surveillance camera system of claim 1, in which there is a photocell that senses photopic light energy and the control circuit compares that energy to infrared radiation and phototopic light energy sensed by the camera, switching the camera to infrared imaging when light energy sensed by the system from an infrared radiation spectrum exceeds light energy sensed from an photopic spectrum and switching the camera to photopic imaging when the light energy sensed by the system from the photopic spectrum exceeds the light energy sensed by the system from the infrared radiation spectrum.

13. The surveillance camera system of claim 12, having an infrared illuminator and a logic circuit in the control circuit that switches on the infrared illuminator when the light energy from both a photopic and an infrared radiation spectrum are below a predetermined level.

14. The surveillance camera system of claim 13, in which:
   a) the camera detects both photopic and infrared radiation, that is it detects photopic light if present, it detects infrared radiation if present, and it detects both if both are present;
   b) the photocell detects only photopic light;
   c) the control circuit compares an output signal from the camera that is correlated with its detection of photopic and infrared radiation with an output signal from the photocell;
   d) the control circuit will reset the system from infrared imaging only if the photocell detects photopic light.

15. The surveillance camera system of claim 14, in which the control circuit functions require a predetermined threshold for a light energy condition to be exceeded for a predetermined period of time before performing a switch in accordance with the light energy condition.

16. The surveillance camera system of claim 12, in which the photocell has a pass band filter adapted to sense light energy levels from a specific light environment.

17. The surveillance camera system of claim 2, having:
   a) an electronic video colour camera with a charge coupled device image sensor;
   b) an infrared illuminator;
   c) a photocell with an optical filter having a spectral pass response substantially similar to that of human eyes.

18. The surveillance camera system of claim 17, in which the bandpass filter:
   a) has a stop band that filters out light of wavelengths in a range of 680 nanometers to 790 nanometers;
   b) passes photopic light of less than 680 and greater than 790 nanometers to the camera;
   c) passes at least 90% of photopic light of wavelengths in a range of 450 nanometers to 650 nanometers and at least 90% of infrared radiation of wavelengths in a range of 820 nanometers to 940 nanometers;
   d) is mounted in close proximity to the charge coupled device image sensor of the camera.

19. The surveillance camera system of claim 18, in which
   a) the infrared illuminator comprises a diode emitting light with a peak of light emission in the range of 850 to 940 nanometers;
   b) there is a photocell that senses photopic light energy and the control circuit compares that energy to infrared radiation and phototopic light energy sensed by the camera, switching the camera to infrared imaging when light energy sensed by the system from an infrared radiation spectrum exceeds light energy sensed from an photopic spectrum and switching the camera to photopic imaging when the light energy sensed by the system from the photopic spectrum exceeds the light energy sensed by the system from the infrared radiation spectrum;
   c) a logic circuit in the control circuit that switches on the infrared illuminator when the light energy from both a photopic and an infrared radiation spectrum are below a predetermined level.

20. The surveillance camera system of claim 19, in which:
   a) the camera detects both photopic and infrared radiation, that is it detects photopic light if present, it detects infrared radiation if present, and it detects both if both are present;
   b) the photocell detects only photopic light;
   c) the control circuit compares an output signal from the camera that is correlated with its detection of photopic and infrared radiation with an output signal from the photocell;
   d) the control circuit will reset the system from infrared imaging only if the photocell detects photopic light.

21. The surveillance camera system of claim 20, in which the control circuit functions require a predetermined threshold for a light energy condition to be exceeded for a predetermined period of time before performing a switch in accordance with the light energy condition.

22. The surveillance camera system of claim 21, in which the photocell has a pass band filter adapted to sense light energy levels from a specific light environment.

* * * * *